Figure 1:
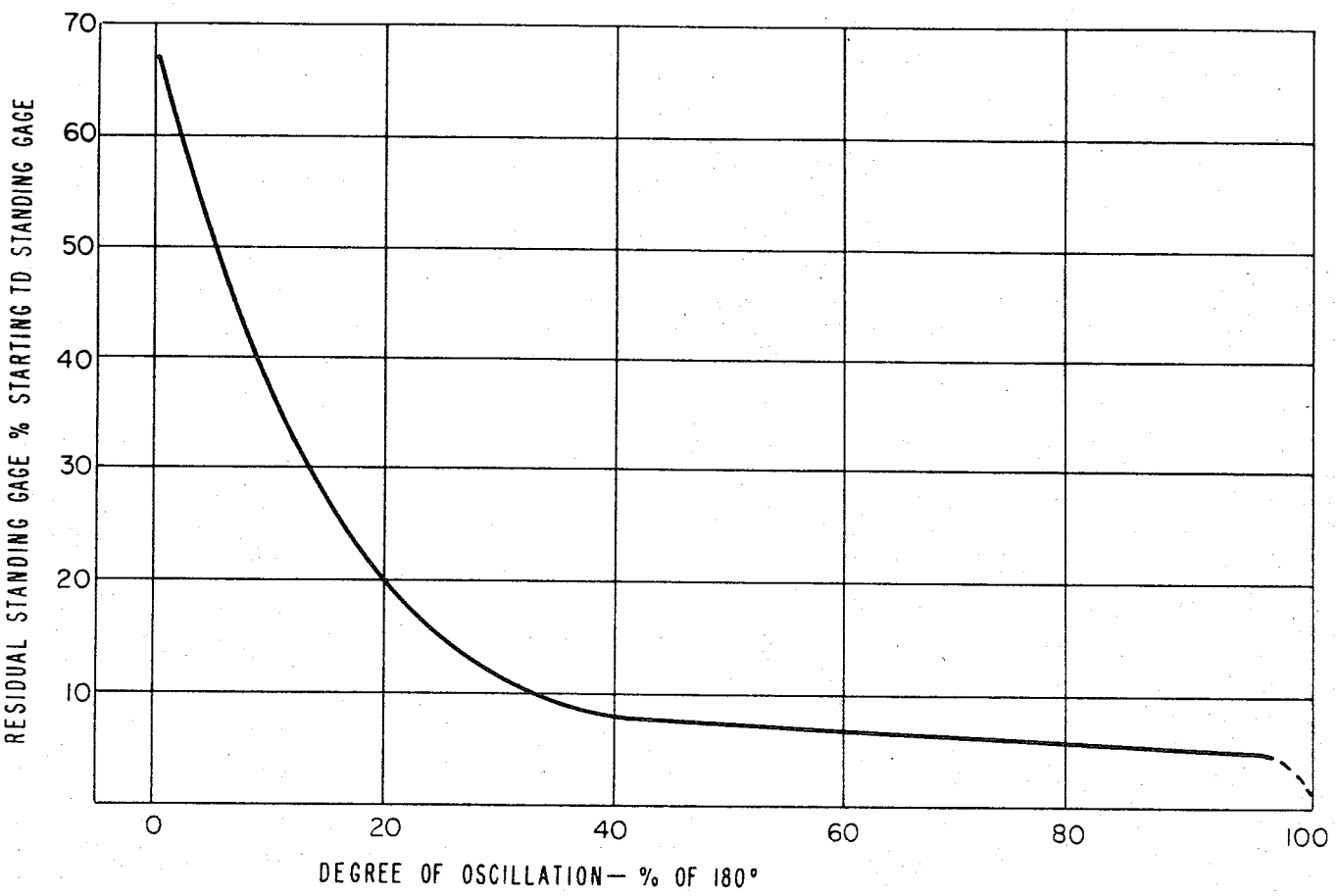
Figure 3:
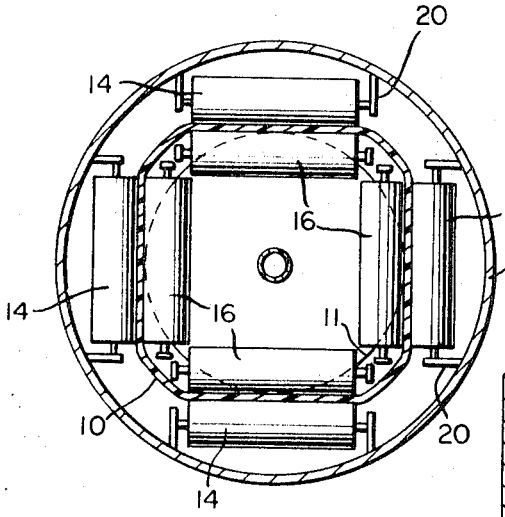
Figure 2:
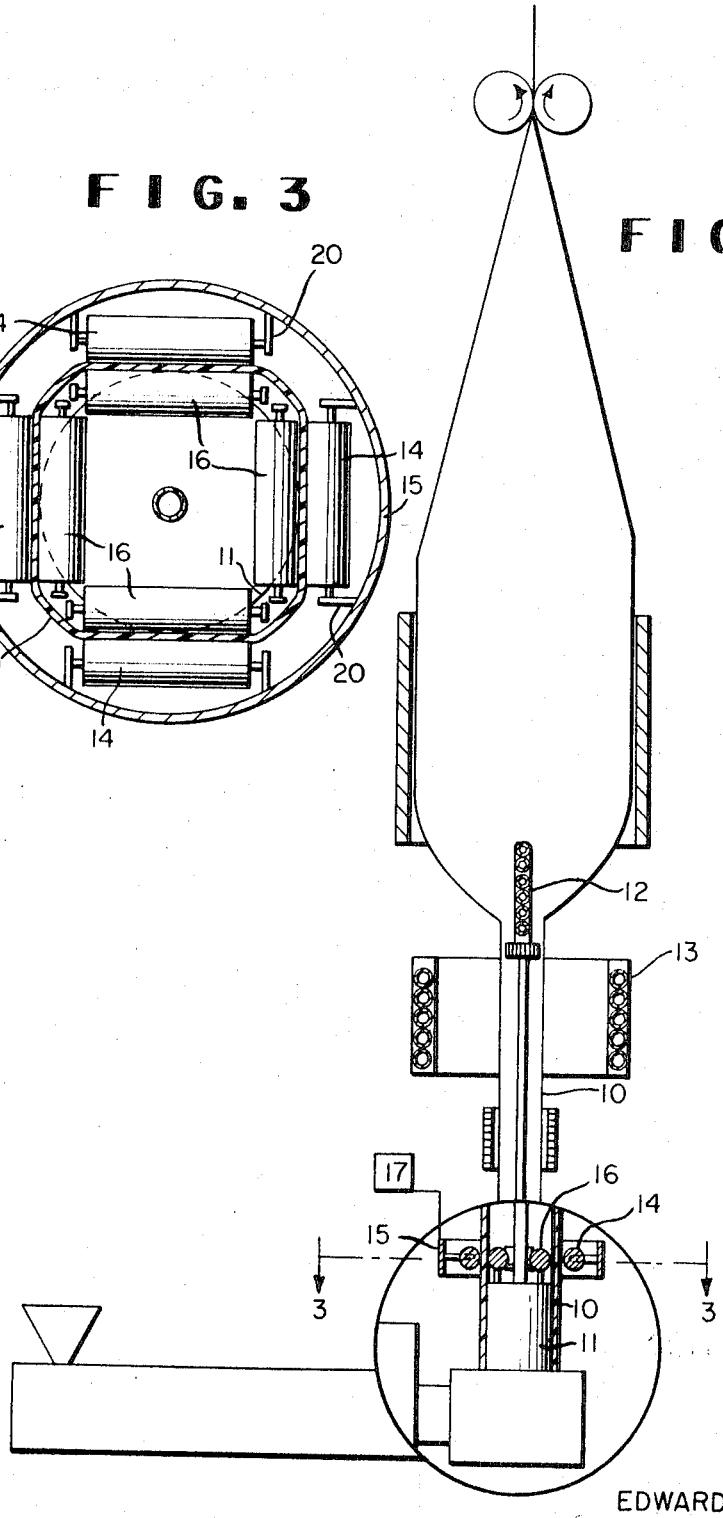

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 26, 1973

911 O.G. 1137

T911,016

TUBULAR PREPARATION OF THERMOPLASTIC FILM

Edward J. Moore, Florence, S.C., assignor to E. I. du Pont de Nemours and Company, Wilmington, Del.

Continuation of abandoned application Ser. No. 36,034, May 11, 1970. This application Mar. 30, 1972, Ser. No. 239,768

Int. Cl. B29c *5/04, 23/00;* B29d *9/24*

U.S. Cl. 264—95

2 Sheets Drawing. 3 Pages Specification

In a continuous process for producing an oriented thermoplastic film comprising extruding a thermoplastic material in its formative state into the form of a tube, quenching the tube to a temperature below its formative state, reheating the tube to a temperature within its orientation temperature range, expanding the tube and thereafter collapsing and collecting the tube, the improvement which comprises oscillating the tube about its axis by applying rotational torque to the tube after quenching and before reheating to distribute gauge irregularities about the circumference of the tube.

It is preferred that the tube be oscillated through a rotational cycle of 180° at a rotational speed of $v/2d$ wherein $v$ is the linear speed of the tube being extruded and $d$ is the distance between the extrusion die and the region of initial orientation expansion to distribute gauge irregularities throughout the full circumference of the tube.

Oscillation of the tube is accomplished by rotation of a tube advancer comprising a plurality of idler rolls circularly disposed around the internal wall of the quenched tube and a plurality of driven rolls in cooperative arrangement with the idler rolls circumferentially positioned immediately exterior to the tube, the idler rolls and the driven rolls each being mounted on rotatable frames.

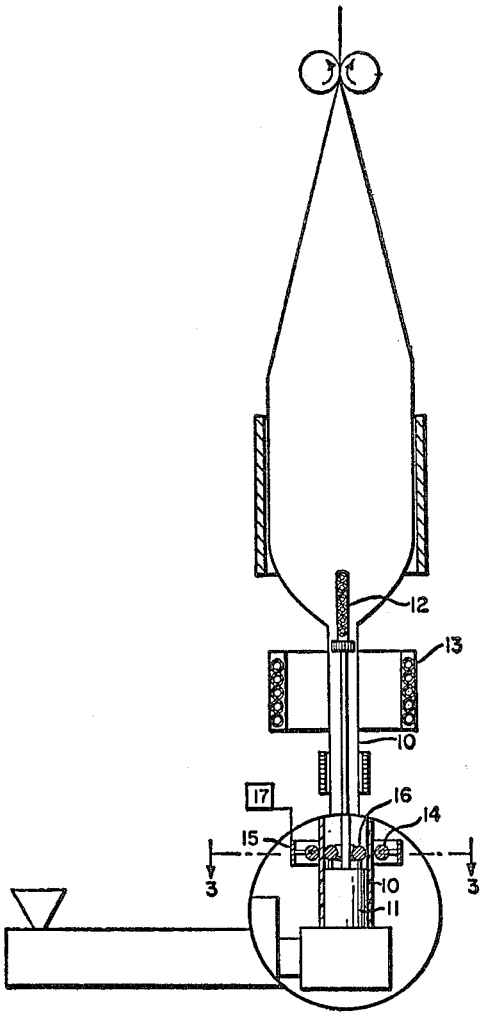

TUBULAR PREPARATION OF THERMOPLASTIC FILM

Original Filed May 11, 1970 2 Sheets-Sheet 1

INVENTOR
EDWARD J. MOORE
BY Donald W. Huntley
ATTORNEY

TUBULAR PREPARATION OF THERMOPLASTIC FILM

Original Filed May 11, 1970 2 Sheets-Sheet 2

INVENTOR
EDWARD J. MOORE
BY Donald W. Huntley
ATTORNEY